United States Patent [19]

Hennessey et al.

[11] 3,881,844
[45] May 6, 1975

[54] BLADE PLATFORM VIBRATION DAMPERS

[75] Inventors: John D. Hennessey, West Chester; Richard Beal, Loveland, both of Ohio

[73] Assignee: General Electric Company, Cincinnati, Ohio

[22] Filed: May 28, 1974

[21] Appl. No.: 473,680

[52] U.S. Cl. ............... 416/145; 416/218; 416/500
[51] Int. Cl. .............................................. F01d 5/10
[58] Field of Search.... 416/144, 145, 500, 219–221, 416/215, 218

[56] References Cited
UNITED STATES PATENTS

| 1,856,786 | 5/1932 | Rice | 416/500 X |
| 2,840,299 | 6/1958 | Paetz | 416/213 X |
| 2,873,088 | 2/1959 | Neumann | 416/220 X |

FOREIGN PATENTS OR APPLICATIONS

| 486,592 | 9/1952 | Canada | 416/500 |
| 612,650 | 4/1935 | Germany | 416/218 |
| 200,107 | 7/1967 | U.S.S.R. | 416/500 |

*Primary Examiner*—Everette A. Powell, Jr.
*Attorney, Agent, or Firm*—Derek P. Lawrence; Lee H. Sachs

[57] ABSTRACT

A turbomachinery assembly equipped with circumferentially disposed blades, having integral platforms and dovetails, is provided with a vibration damping means disposed circumferentially about the perimeter of a dovetail engaging the disc between the disc and the blade platforms. The vibration damper, in one embodiment, comprises a spiraled encasing means wound around a flexible core element. As the vibration damper is centrifugally forced into contact with the blade platform, blade platform vibratory energy is transmitted to the damping means and is dissipated as heat through relative frictional movement between adjacent portions of the encasing means and between the encasing means and the flexible core.

13 Claims, 7 Drawing Figures

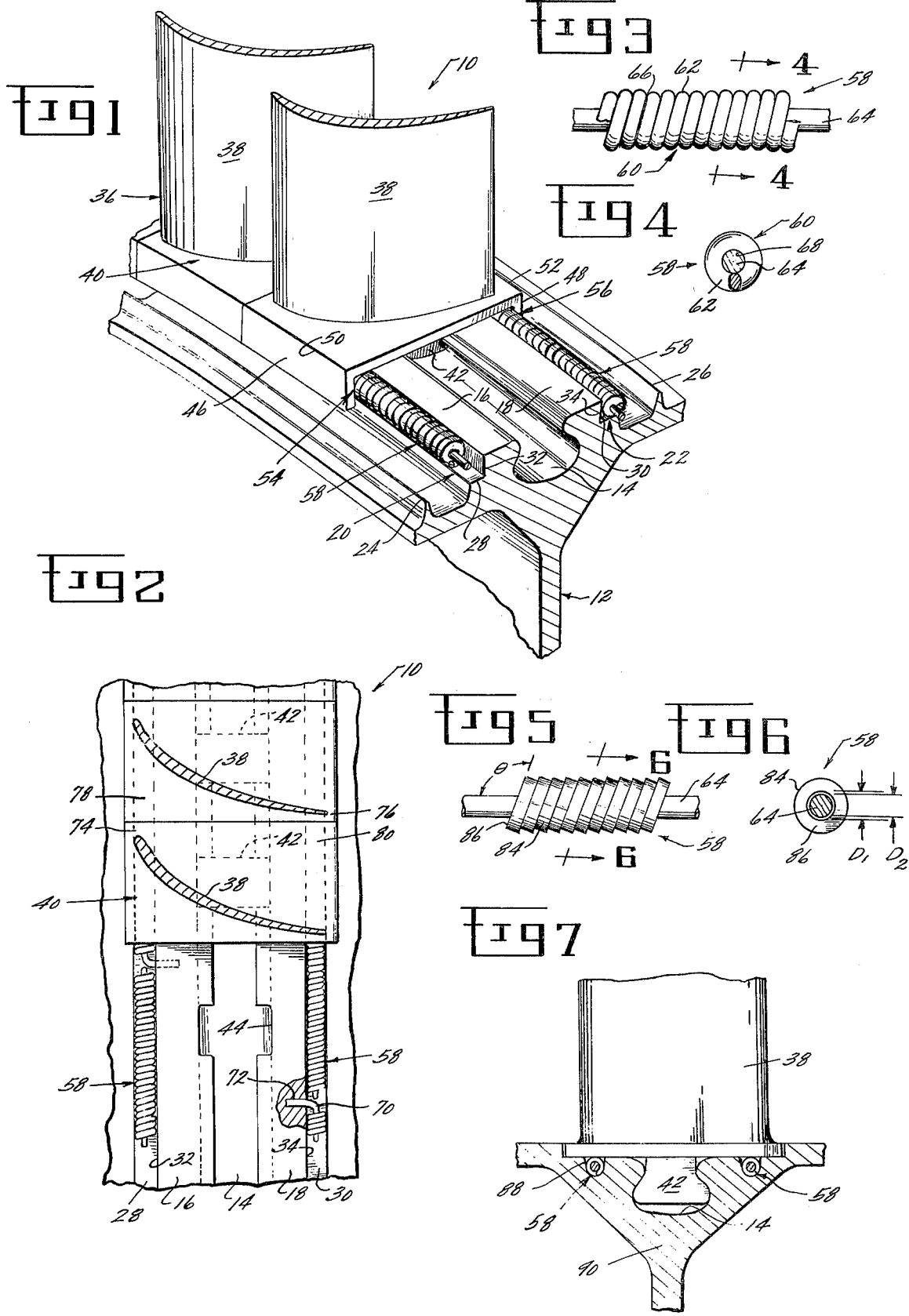

BLADE PLATFORM VIBRATION DAMPERS

BACKGROUND OF THE INVENTION

This invention relates generally to turbomachinery rotor and stator blades with integrally attached platforms and, more particularly, to an improved vibration damping means to reduce blade platform vibratory energy.

Gas turbine engine manufacturers are continually seeking solutions to blade vibration problems, particularly where such blades are provided with integral blade platforms. Significant blade platform resonances may occur over the normal operating range of a gas turbine engine due, in part, to vibratory energy transmitted from the blade to the platform. Designing to avoid these resonances may result in compromises which are unacceptable. For example, increasing the mass of the platform could adversely affect the weight of the turbomachinery. Removing a corner of the platform to tune it out of a particularly critical resonance could introduce voids in the fluid flow path. Integrally locking adjacent blade platforms together could lessen ease of assembly and disassembly.

These compromises are subject to the additional short-comings that, since blade platform vibrations are a function of blade rotational speed, airfoil aerodynamic loading, the relative velocity of the working fluid with respect to the airfoil and the mass and spring constant of the platform, a solution which would eliminate one particularlay resonant frequency may not eliminate resonance at other engine operating conditions and, in fact, may aggravate otherwise acceptable vibration levels. One prior art approach to the problem has been the provision of a plurality of pins which fit into openings in the rotor disc and wherein, under the action of centrifugal force, these pins are forced into frictional contact with the overhanging blade platforms. However, this approach has the inherent disadvantage of producing fretting at the frictional interface between the platform and pins due to the limited contact area afforded by the pins. Another approach utilizes resilient pads forced between the platform and disc, but the pads have lacked the required stiffness to produce effective damping, have deteriorated due to high temperatures, or have deformed.

SUMMARY OF THE INVENTION

The primary object of the present invention, therefore, is to provide a more effective and more reliable blade platform vibration damper which will absorb blade platform vibrational energy and thereby damp blade platform movement.

Essentially, this object is accomplished by disposing a vibration damping means circumferentially about the perimeter of the blade disc between the disc and the blade platform. The vibration damping means consists of an encasing means coaxial with a flexible core element. In its various embodiments, the encasing means may comprise a plurality of washer-like elements or a spiral winding (similar to a guitar string). Centrifugal force causes the damping means to be in frictional contact with the blade platform whereby blade platform vibratory energy is transmitted to the damping means. Through frictional interplay between adjacent encasing elements and between the elements and the core, such vibratory energy is dissipated as heat. The flexibility of the core element permits the damping means to conform to the physical disposition of the platform thereby insuring maximum contact between the platform and damper. Increased rotational speed increases the force exerted by the damping means on the blade platform. Though abutting corners of adjacent platforms normally tend to vibrate at different frequencies and amplitudes, as a result of all the platforms being in frictional contact with a common damping element according to this invention, blade platform relative movement with respect to an adjacent platform is thus reduced. Additionally, disposition of a circumferential vibration damper between the platform and disc has the inherent benefit of improving turbomachinery performance by creating a labyrinth flow path under the platform to inhibit flow under the platform from the high to low pressure sides of the blade.

DESCRIPTION OF THE DRAWINGS

While the specification concludes with a series of claims particularly pointing out and distinctly claiming the subject matter which Applicants regard as their invention, it is believed that the invention will be better understood from the following description in connection with the attached drawings, in which:

FIG. 1 is a perspective view of a turbomachinery disc assembly incorporating the subject invention;

FIG. 2 is a sectional view of the disc assembly of FIG. 1;

FIG. 3 is an enlarged view of an embodiment of the vibration damping means constructed in accordance with the present invention;

FIG. 4 is a cross-sectional view, taken along line 4—4, of FIG. 3;

FIG. 5 is an enlarged view, similar to FIG. 3, of an alternative embodiment of the subject invention;

FIG. 6 is a cross-sectional view, taken along line 6—6, of FIG. 5; and

FIG. 7 is a sectional view of a turbomachinery disc assembly incorporating an alternative installation of the subject invention.

DESCRIPTION OF A PREFERRED EMBODIMENT

Referring to the drawings, wherein like numerals correspond to like elements throughout, attention is initially directed to FIG. 1 wherein a turbomachinery assembly 10 includes a disc 12 having a circumferential mounting slot 14, lands 16, 18, circumferential recesses 20, 22 and seal teeth 24, 26. Circumferential recesses 20, 22 are defined by circumferential surfaces 28, 30 and radial surfaces 32, 34, respectively. A plurality of blades 36, each comprising an airfoil 38, a platform 40 and a mounting dovetail 42, are loaded through loading slots 44 of lands 16, 18 (FIG. 2) in a manner well known to those familiar with the art, so as to form an annular cascade of blades. In the preferred embodiment, the platforms 40 are provided with radially inward extending flanges 46, 48 on the axially forward and aft edges 50, 52, respectively, of each platform 40. As installed, the circumferential surface 28, the radial surface 32, the platform flange 46 and the lower surface of the platform 40 cooperate to define a circumferential passage 54 of generally rectangular cross section. A similar passage 56 is located under the axially aft end of the platform 40, defined by surfaces 30, 34, platform 40 and flange 48.

A vibration damper is inserted within passage 54 around the periphery of the disc 12. When not in operation, the damper 58 is loosely held within the passage 54 in spacial relationship with the platform 40. The vibration damper 58 comprises, in the preferred embodiment of FIG. 3, an encasing means 60 comprising a flexible coil 62 spirally wound about a flexible core element 64 in the manner of a piano or guitar string. The turns of the flexible coil encasing means 60 are in frictional contact with adjacent turns at interfaces 66 and also with the outer surface of the flexible core element 64 at interface 68 as shown in FIG. 4. In the embodiment of FIGS. 1 and 2, the damper 58 is segmented circumferentially and each segment is restrained from substantial circumferential movement as by providing one end with a right-angle bend 70 and keying it into a slot 72 in the disc 12 (FIG. 2). This embodiment provides ease of assembly. An equally effective embodiment could utilize a continuous circular damper of similar characteristics.

As depicted in FIG. 2, most airfoils 38 are mounted diagonally upon their respective platforms 40. Thus, there are formed two platform corners 74, 76 which are relatively proximate the airfoil 38 and two corners 78, 80 which are relatively remote. As a result of the diagonal blade disposition, the platform will vary in stiffness and the near (stiffer) corners 74, 76 will tend to vibrate at a low amplitude, whereas the remote (less stiff) corners 78, 80 will vibrate at higher amplitudes.

In operation, the disc 12 rotates about its axis (not shown) and the rotation of the blades 36 pumps air from left to right (FIG. 1). Aerodynamic exciting forces, both transient and steady-state, arise due to the pumping action, thereby directly inducing vibration in the platforms 40. Additional vibratory forces can be induced in the platform through direct mechanical coupling with the blade airfoil 38. Uncontrolled, these vibrations can lead, in part, to blade and platform cracking.

Centrifugal force created by rotation of the disc 12 forces the vibration damper 58 into frictional contact with the undersurface of the platform 40. The degree of force is directly proportional to the square of rotational speed. Since the centrifugal forces load the vibration damper 58 into contact with the platforms 40, adjacent sections of the vibration damper 58 experience low amplitude and high amplitude vibrations simultaneously which correspond to the vibratory modes of the near and remote corners 60, 64, respectively. This induces relative movement between adjacent spirals of the flexible coil and casing means 62 and between the flexible coil 62 and the flexible core element 64. The vibrational energy of the platforms will be transmitted to the damper and will be dissipated at the frictional interfaces 66, 68 in the form of heat. This damping, coupled with the action of the damper 58 under centrifugal loading, will restrict the amplitude of vibration of the blade platform.

The degree of damping may be controlled through the choice of materials utilized for the encasing means 60 and the flexible core element 64 which affect the mass and spring constant of the vibration damping means 58.

Additionally, the positioning of a circumferential vibration damper 58 between the platform 40 and the disc 12 has the inherent benefit of improving turbomachinery performance by creating a labyrinth flow path under the platform 40 to inhibit undesired flow. Heretofore, fluid flow was free to pass from the relatively high pressure area at the platform aft edge 52, between the platform 40 and the lands 16, 18 to the relatively low pressure zone at the platform lower edge 50. By incorporating the subject invention, the labyrinth flow path created beneath the platform 40 necessitates that the flow must additionally circumvent flanges 46 and 48, as well as the vibration damping means 58, in order to traverse the platform.

It should be obvious to one skilled in the art that certain changes can be made to the above-described damping means without departing from the broad inventive concepts thereof. For example, in certain applications the encasing means 60 may comprise a series of washer-like discs 84 disposed upon the flexible core element 64 as shown in FIG. 5. These discs 84 may be drilled at some angle other than 90° to the disc face 86, or to some diameter $D_1$ greater than the diameter $D_2$ of the flexible core element 64 (FIG. 6) such that the discs 84 are disposed at some angle, $\theta$, other than 90° with respect to the longitudinal axis of the flexible core element 64. The operation of such a damper is substantially the same as in the previously discussed embodiment. Additionally, in some applications, it may be advantageous to have the damper means 58 disposed in a circumferential slot 88 around the periphery of a somewhat modified disc 90 (FIG. 7). It is intended that the appended claims cover these and all similar variations in Applicants' broader inventive concept.

What we claim is:

1. In a turbomachinery assembly including a fluid flow path, generally cylindrical support means, a plurality of radially extending blades attached to said support means, each of said blades comprising an airfoil, mounting means for attaching said blade to said support means, and a platform disposed in a spaced relationship with said support means and positioned between the airfoil and the mounting means for partially defining the flow path, vibration damping means comprising:

encasing means disposed between said support means and said blade platform, being in frictional contact with and capable of exerting radial pressure on said blade platforms during operation in the fluid flow path, for damping blade platform movement; and a flexible core element cooperating with and movable with respect to said encasing means, and in frictional contact therewith.

2. The vibration damping means of claim 1 wherein said encasing means comprises a flexible coil disposed in a spiral around said core element, predetermined of said turns of said spiral being in frictional contact with adjacent turns.

3. The vibration damping means of claim 2 wherein said core element is segmented, each segment disposed generally about a portion of the circumference of said support means and wherein said segments include restraining means to preclude substantial circumferential movement of said core element segments with respect to said support means.

4. The vibration damping means of claim 3 wherein said restraining means comprises a slot in said support means and wherein a predetermined portion of each segment is disposed at an angle to the remainder of the segment and keyed into said slot.

5. The vibration damping means of claim 1 wherein the encasing means comprises a plurality of members generally encircling said core element, said members movable relative to one another and to said core, and predetermined of said members in frictional contact with one another.

6. The vibration damping means of claim 5 wherein the plurality of members generally encircling the core are disposed at some angle other than 90° to the longitudinal axis of the core element.

7. The vibration damping means of claim 6 wherein the members generally encircling the core are discrete annuli.

8. The vibration damping means of claim 5 wherein said core element is segmented, each segment disposed generally about a portion of the circumference of said support means and wherein said segments include restraining means to preclude substantial circumferential movement of said core element segments with respect to said support means.

9. The vibration damping means of claim 8 wherein said restraining means comprises a slot in said support means and wherein a predetermined portion of each segment is disposed at an angle to the remainder of said segment and keyed into said slot.

10. The vibration damping means of claim 1 wherein said vibration damping means cooperates with said platform and said support structure to create a labyrinth flow path for inhibiting fluid flow between said support means and said blade platform.

11. The turbomachinery assembly of claim 10 further characterized in that said support means comprises a rotatable disc, and wherein said radial pressure is a result of centrifugal forces on said vibration damping means.

12. The vibration damping means of claim 11 wherein said disc includes a circumferential recess and wherein said vibration damping means is partially disposed within said recess.

13. The vibration damping means of claim 12 wherein said vibration damping means comprises a severed ring disposed circumferentially between said rotatable disc and said blade platform.

* * * * *